UNITED STATES PATENT OFFICE.

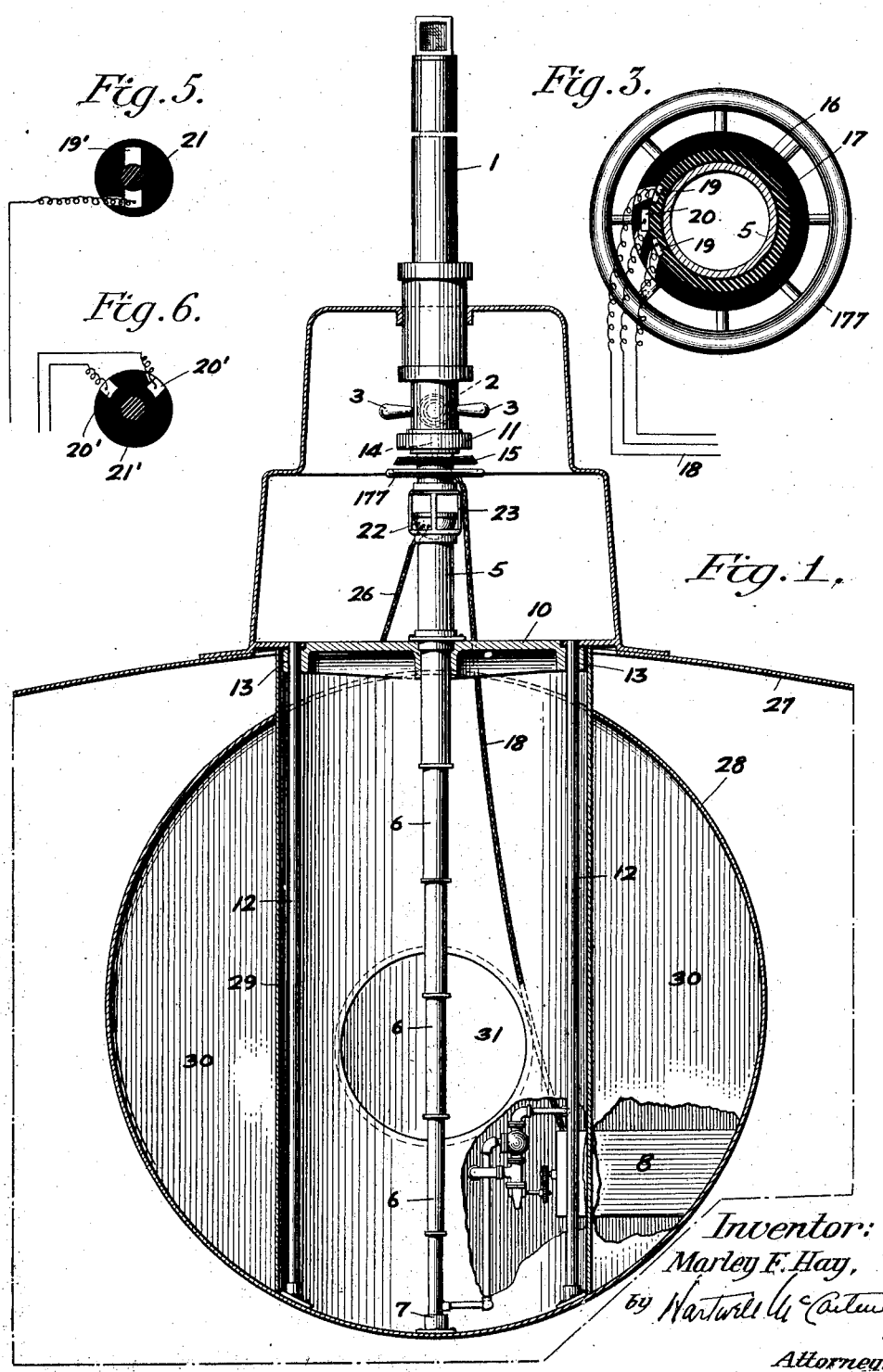

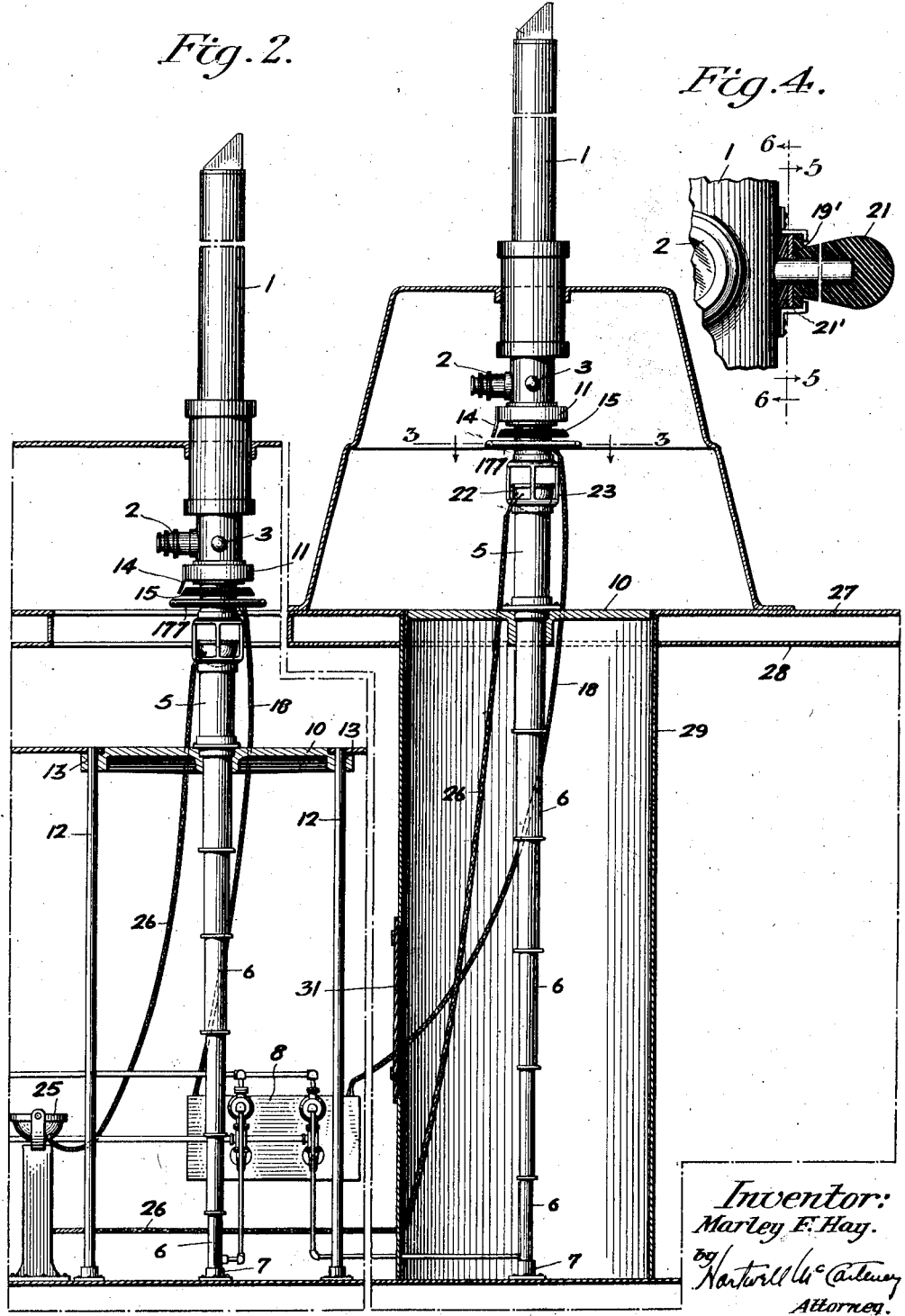

MARLEY F. HAY, OF THE HAGUE, NETHERLANDS.

SIGHTING INSTRUMENT.

1,350,225. Specification of Letters Patent. Patented Aug. 17, 1920.

Application filed December 12, 1917. Serial No. 206,772.

*To all whom it may concern:*

Be it known that I, MARLEY F. HAY, a subject of the King of Great Britain and Ireland, residing at The Hague, Netherlands, have invented certain new and useful Improvements in Sighting Instruments, of which the following is a specification.

This invention relates to sighting instruments, and more particularly to periscopes and the like, which, while designed primarily for use either in the conning tower or in the central station of a submarine, may also be installed for observation purposes behind fortifications of various types.

The essential feature of the invention is the provision of certain improvements in or relating to the mounting of an instrument of the general nature stated above, whereby the installation of the instrument is facilitated and its operation simplified and rendered more effective, in contradistinction to the system of mounting in present use which possesses serious technical disadvantages of one character or another. The improvements in question will be subsequently described in detail as applied to a submarine; but it will be understood from the foregoing that no limitation to such specific use or application is contemplated, since the broad principles involved in the invention are susceptible of embodiment in devices designed for use or installation in other and different environments.

As regards the aforesaid improvements, it may be stated that the most important one relates to the mounting of a housing periscope—that is to say, a periscope which, on occasion, is capable of being drawn into the body of the boat until its top projects a slight distance only above the conning tower—in such a way as to enable the observer to look through the eye-piece with equal facility in any position of elevation. Ordinarily, it is possible, especially in the case of submarines equipped with long housing periscopes, which type of periscopes recent experience has demonstrated as extremely desirable, to conveniently look through the eye-piece only when the periscope is in its top position, or within three or four feet of such position. When the periscope is lowered beyond that point, the eye-piece is brought so close to the floor or platform whereon the observer stands, that he is compelled to assume a most uncomfortable stooping position, while for him to walk around with the periscope in sweeping the horizon, is practically impossible.

Again, it is vitally important that the exact bearing of the periscope relative to the course of the submarine can readily and accurately be determined. With a fixed or non-housing periscope, this is usually done by attaching to the ship's structure, in a position above and concentric with the periscope, a pelorus circle graduated in 360°, with which a fixed pointer on the periscope coöperates, the pointer extending to the zero mark on the pelorus scale when the periscope is looking dead ahead. With the introduction of housing periscopes, however, a serious difficulty was presented in that the reading could only be taken when the periscope was in top position, because the hauling down of the periscope necessarily entailed a separation of the pointer from the scale.

A further difficulty which appeared with the advent of the housing periscope, and which related especially to the periscope in the conning tower, arose from the fact that the periscope, in its housing movement, either had to stop at the water-tight deck,— which separates the conning tower from the ship's structure in all modern submarines— or to enter a well, both arrangements rendering it impossible to effectively use the periscope at such time.

Still another difficulty was presented by the gyroscopic compass, which is utilized to give the bearing of the boat. In the case of the relatively-fixed periscope, it was a comparatively simple matter to locate either the gyroscopic master compass or the repeater compass under the periscope, and by means of a system of lenses and prisms project into the field of the periscope a small portion of the compass rose giving the required bearing. In constructing a housing periscope, however, it is obviously impossible for the compass to retain this position, owing to the provision of the housing.

The present invention, as will be explained, contemplates and provides for the elimination of all of the above difficulties. According to the invention, the periscope is carried by, and rotatably connected with, one section of a telescopic mast, which may be operated in any suitable manner, preferably with the aid of electric controls, so that the extension or telescoping of the mast will raise or lower the periscope. The aforesaid mast section is rigidly attached to a platform which rises and falls according as said section moves up or down, but is held against rotary movement. By reason of this arrangement, the distance between the eye-piece of the periscope and the platform is maintained constant at all times, with the result that the observer is enabled to use the periscope without discomfort in any position of elevation; the size of the platform being sufficiently great to permit him to walk entirely around it, if necessary, turning the periscope in either direction at will, and to any desired extent. The electric controls for the hoisting mechanism are likewise mounted upon the aforesaid mast section, and in such a manner as to permit them to be operated with the same degree of ease no matter where the observer stands on the platform, in consequence whereof the observer can raise or lower the periscope without having to move from one position to another.

In the case of the pelorus scale, this device is likewise fixed to the stationary mast section, and its companion pointer to the periscope, from which it follows that the two will remain constantly in operative reading position, the pointer traveling over the scale as the periscope is turned in one direction or the other. The mast section also carries, at its extreme upper portion, the gyroscopic repeater compass, which can then be reflected into the periscope in any position of elevation or of azimuth.

Other and further objects and alvantages will appear as the description of the invention proceeds; and in this connection reference is made to the accompanying drawing, showing, by way of example, one structural embodiment of the invention. The exact details of the structure illustrated therein are not to be understood, however, as essential to the invention, excepting in so far as specifically set forth in the appended claims. Parts of the invention, as illustrated, may also be used by themselves, or in connection with parts other than those specifically represented.

In the drawings:—

Figure 1 is a transverse vertical section of a submarine equipped with the invention.

Fig. 2 is a fragmental longitudinal section showing both the periscope in the conning tower and the one in the central station.

Fig. 3 is an enlarged detail view, partly in longitudinal section, showing one form of electric controller for the hoisting mechanism.

Fig. 4 is a fragmental detail view, with parts in vertical section, showing a developed or modified form of controller.

Figs. 5 and 6 are diagrammatic vertical sections taken, respectively, on the lines 5—5 and 6—6 of Fig. 4, looking in the direction of the arrows.

Referring more particularly to said drawing, 1 designates, generally, a periscope of the usual form, or of any other suitable construction, and 2 the eye-piece at the lower end thereof equipped with the handles 3 by means of which it may be turned in the ordinary manner to sweep the horizon. The periscope is rotatably carried by an inverted telescopic mast, and, in this instance, is shown as mounted upon the uppermost section 5 thereof; the various remaining mast sections 6, of which there may be any desired number, decreasing successively in diameter and being slidably interfitted so to enable the mast to be extended or contracted at will, and the lowermost section having its lower end fitted in a sleeve or socket 7 provided for it and affixed to the floor of the hull of the ship. Any suitable mechanism, whether mechanical or hydraulic, may be employed for the purpose of operating the mast; but since the precise form of such mechanism constitutes no part of the actual invention, its representation in a purely diagrammatic manner, as indicated at 8, is considered sufficient for all practical purposes. It is desired, however, to utilize suitable electic controls for throwing the hoisting or elevating mechanism, whatever its character, into and out of action, and to construct and arrange the controls in such a way as to enable them to be operated by the observer, with equal facility and without changing his position, in any position of elevation of the periscope and irrespective of the direction or extent in or to which it may have been turned. This feature will be subsequently described in detail at the proper place.

The aforesaid uppermost mast section 5 has rigidly fastened to it a carrier or support 10 for the observer, who may either sit or stand upon the support, or walk around it, turning the periscope around as he moves, according to the size and construction of the support and the character or type of the periscope. In the particular construction illustrated, which may be regarded for all present purposes as preferred, the aforesaid carrier 10 takes the form of a horizontal platform, in practice about five feet in diameter, thus providing ample space for the observer to walk entirely around the mast section. The latter, owing to the rigid connection of the platform or carrier thereto, is held against rotation; whereas the periscope, as above stated, is rotatably mounted upon said section for the purpose indicated, a ball-bearing ring 11 being interposed between the confronting ends of the mast section and periscope. The platform itself is prevented from rotating by being slidably mounted upon a pair of vertical guide bars 12, these bars having a relatively-tight sliding fit in diametrically-opposite openings 13 formed through said platform.

By virtue of the arrangement above described, it will be apparent that the platform, or observer's stand, must rise and fall with the extension and contraction of the mast; and from this, it necessarily follows that the distance between the eye-piece of the periscope and the platform is maintained constant for all positions of the periscope, that is to say for any and all extents to which the periscope may be housed. Hence, the observer can readily use the periscope at all times and without being compelled to stoop over or otherwise change his attitude while the periscope is being housed. The direct connection of the periscope to the stationary mast section 5 also enables the two elements which determine the bearing of the periscope relative to the ship's course, i. e., the pointer 14 and the pelorus scale 15, to be constantly maintained in co-active position throughout the rising and falling movements of the periscope; one of such elements (in this instance, the pelorus scale) being fastened to the upper end of the mast section, while the other element (the pointer) is fixed to the periscope in position to extend permanently across said scale. Consequently, the contraction of the mast will entail no separation of the two parts mentioned, for the obvious reason that the periscope and mast section move vertically as a unit at all times, while the independent rotary movement of the periscope causes the pointer to travel along the scale, and, therefore, permits the reading to be taken for all positions of the periscope.

So far as regards the operation of the hoisting mechanism 8, which effects the elevation and contraction of the mast, it is, of course, a matter of extreme advantage to provide for such operation by the observer for all positions of the periscope, both vertical and angular, so that the periscope may be constantly under the complete control of the observer to be instantly raised and lowered as occasion demands. This object may be effected by means of the system of electrical controls previously referred to, one form of which is illustrated in detail in Fig. 3. According to the construction therein depicted, there is employed a ring 16, which is fixed to the stationary mast section a slight distance below the pelorus scale 15 and is encircled by a ring 17, to which there is concentrically connected, in turn, an outer or operating ring 177. The mounting of the rings 177 and 17 is such as to render them capable of a slight rotary movement in unison in either direction with relation to the ring 16—three or four inches for example—the outer ring 177, which is adapted to be grasped, permitting such movement to be effected by the observer irrespective of the position which he may happen to be occupying at that particular time on the support or platform 10. This movement of the operating ring tends to carry the ring 17 out of a normal idle position into a position for effecting either forward or reverse operation of the hoisting mechanism, according as the movement takes place in one direction or the other; said ring 17 therefore acting as a switch which is moved from circuit-breaking or neutral position into either of two circuit-closing positions. The precise details of the electrical connections are immaterial to the invention, however, and for that reason are not illustrated, it being considered sufficient to state that the current necessary for actuating the mechanism is supplied from a battery (not shown) to flexible electric cables 18, which are connected therewith and lead at one end to the aforesaid mechanism and terminate at the other end in suitable contacts 19 and 20 disposed, respectively, on the rings 16 and 17. By utilizing flexible cables, and running them up through the platform or support 10 to the said rings 16 and 17, it will be apparent that all danger of their becoming twisted or otherwise injured during the adjustment of the periscope and its carrier mast section is avoided, due to the fact that the latter and the supporting platform are positively held against rotation.

The construction just described may also be developed somewhat while still maintaining all of the original advantages thereof. That is to say, instead of locating the operating ring and its connected switch ring on the mast section, a set of co-acting contacts 20' and 19' may be provided to be controlled by one or the other of the two handles of the periscope, for which purpose said handle may embody or be equipped with an outer rotary section or member 21, to which the movable contact 19' is connected, as indicated in Figs. 4 and 5, the fixed inner section or member 21' carrying the contacts 20', (Fig. 6). In this way, the hoisting mechanism may be controlled in the same manner as before, but with the further advantage that the operator can actuate the switch at will, without having to remove either hand from the handle on the eye-piece; in other words, without being compelled to interrupt the manipulation of the periscope, the importance of which is readily perceptible.

The stationary mast section 5 is preferably so constructed as to enable a gyroscopic repeater compass 22 to be mounted therein, as shown in Figs. 1 and 2. The upper portion of the mast section may, accordingly, have the form of a special casting, which is indicated at 23, said casting being designed to receive the repeater compass which is inserted therein in any suitable manner. The master compass 25 may be applied to the ship's structure at any convenient point, and both it and the repeater compass may be of any approved type, the electrical connections 26, leading from the master compass to the usual motor (not shown) within the repeater compass, being likewise in the form of flexible cables. The rose of the repeater compass may be projected into the periscope optically in the same manner as is now customary with non-housing periscopes, illustration of this feature being deemed unnecessary.

The construction above described may be installed in any of the types of submarines at present in commission, whether formed with a single hull only, or with inner and outer hulls 27 and 28, as illustrated. It is also applicable, without departing from the basic principles involved, and with practically no change in the actual mounting itself, both to the conning tower periscope and to the periscope in the central station. In the latter case, (see Fig. 2), the guide bars 12 will be open in the ship; but in the case of the conning tower periscope, the water-tight integrity of the tower must be preserved, and it is, therefore, necessary to inclose the guides in a vertically-disposed cylindrical well 29, preferably constructed in one of the transverse pressure bulk-heads 30, such arrangement serving to very materially stiffen the bulk-head. If desired, a water-tight door 31 may be fitted in the lower part of the well, thus giving access to the boat without the necessity of raising the platform to the level of the conning tower floor.

I claim as my invention:—

1. The combination, with a periscopic sighting instrument; of a rising and falling carrier whereon said instrument is rotatably mounted to be raised and lowered; said carrier constituting a bodily support for the observer using the instrument and a housing for the carrier in which the latter is movable.

2. The combination, with a periscopic sighting instrument; of a non-rotatable, rising and falling carrier whereon said instrument is rotatably mounted to be raised and lowered and turned in either direction at any elevation and independent of the carrier; said carrier constituting a bodily support for the observer using the instrument and a housing for the carrier in which the latter is movable.

3. The combination, with a sighting instrument; of a rising and falling platform whereon said instrument is axially and rotatably mounted to be raised and lowered and turned in either direction at any elevation and independent of the platform; said platform constituting a support for the observer using the instrument and upon which he may walk around and rotate said instrument and a housing for the platform in which the latter is movable.

4. The combination, with a sighting instrument; of a rising and falling carrier on which said instrument is mounted and with which it is connected to move vertically as a unit, whereby the distance between the eyepiece of the instrument and said carrier is maintained constant for all positions of elevation of the instrument; said carrier constituting a bodily support for the operator using the instrument and a housing for the carrier in which the latter is movable.

5. The combination, with a periscope; of a rising and falling carrier for the periscope to elevate or house the same; said carrier constituting a bodily support for the observer using the periscope and a conning tower to house the carrier.

6. The combination, with a rising and falling carrier; of a sighting instrument movably mounted on said carrier to be raised or lowered therewith; said carrier constituting a bodily support for the observer using the instrument; lifting mechanism for said carrier; and a controller for said lifting mechanism movable with the carrier and operable by the observer on said carrier in any position of elevation or of rotation of the instrument.

7. The combination, with a rising and falling carrier; of a sighting instrument mounted to move vertically as a unit with said carrier, but capable of an independent rotary movement with respect thereto; said carrier constituting a bodily support for the observer using the instrument; lifting mechanism for said carrier; and a controller for said lifting mechanism connected for vertical movement in unison with the carrier, but also capable of operative movement relative to the same, whereby it may be actuated by the observer on the carrier in any position of elevation or rotation of the instrument.

8. The combination, with a rising and falling carrier; of a sighting instrument mounted to move vertically with said carrier as a unit; said carrier constituting a bodily support for the observer using the instrument; mechanism for raising and lowering said carrier; and an electric controller for said mechanism connected to move vertically in unison with said instrument and operable by the observer on said carrier to effect the starting and stopping of said mechanism and to selectively determine its raising and lowering action at any point in the movement of the carrier or position of the instrument.

9. The combination, with a rising and falling carrier; of a sighting instrument mounted to move vertically with said carrier as a unit, but capable of an independent rotary movement with respect thereto; said carrier constituting a bodily support for the observer using the instrument; mechanism for raising and lowering said carrier; and an electric controller connected to move vertically in unison with said instrument and movable in either direction from a normal neutral position by the observer on said carrier in any position of elevation or rotation of the instrument, to selectively effect forward or reverse action of said mechanism.

10. The combination with a housing, a telescopic vertical mast, and mechanism for extending and contracting the mast in the housing; of a sighting instrument rotatably connected with one section of the mast to rise and fall in unison therewith; and a carrier for the observer using the instrument fixed to said mast section to move vertically with the same, whereby the distance between the eye-piece of the instrument and said carrier is maintained constant for all positions of elevation of the instrument.

11. In combination, with a telescopic vertical mast, a conning tower, and mechanism for extending and contracting the mast in the tower; of a sighting instrument rotatably mounted on the topmost section of the mast to rise and fall in unison therewith; a carrier for the observer using the instrument fixed to said topmost section to move vertically with the same, whereby the distance between the eye-piece of said instrument and said carrier is maintained constant for all positions of elevation of the instrument; and means for holding said carrier against rotation during its movements.

12. The combination, with a housing, a telescopic vertical mast, and mechanism for extending and contracting the mast in the tower; of a sighting instrument rotatably connected with one section of the mast to rise and fall in unison therewith; and a carrier for the observer using the instrument fixed to said mast section to move vertically with the same, whereby the distance between the eye-piece of the instrument and said carrier is maintained constant for all positions of elevation and rotation of the instrument.

13. The combination, with a telescopic vertical mast, and mechanism for extending and contracting it; of a sighting instrument mounted upon the topmost section of the mast to rise and fall in unison therewith, but capable of an independent rotary movement with respect thereto; said instrument and mast section forming a pair of companion elements; and bearing-determining means comprising a pelorus scale attached to one of said companion elements and a pointer fixed to the other element for permanent coöperation with said scale in all positions of the instrument.

14. The combination, with a telescopic vertical mast, and mechanism for extending and contracting it; of a sighting instrument mounted upon the topmost section of the mast to rise and fall in unison therewith, but capable of an independent movement with respect thereto; a carrier for the observer using the instrument fixed to said mast section to move vertically with the same, whereby the distance between the eye-piece of the instrument and the carrier is maintained constant for all positions of elevation and rotation of said instrument; and bearing-determining means comprising a pair of permanently coöperating elements, one fixed to said mast-section and the other to said instrument.

15. The combination, with a telescopic vertical mast, and mechanism for extending and contracting it; of a sighting instrument connected with one section of the mast to rise and fall in unison with it, but capable of an independent rotary movement with respect thereto; a carrier for the observer using the instrument fixed to said mast section to move vertically with the same, whereby the distance between the eye-piece of the instrument and the carrier is maintained constant for all positions of elevation and rotation of said instrument; bearing-determining means comprising a pair of permanently coöperating elements, one fixed to said mast section and the other to the said instrument; and means for holding said carrier against rotation during its movements.

16. The combination, with a telescopic vertical mast, and mechanism for extending and contracting it; of a periscope connected with one section of the mast to rise and fall in unison therewith, but capable of an independent rotary movement with respect thereto; means for holding said mast section against rotation during its vertical movements; and means for determining the bearing of the periscope relative to the ship's course comprising a pair of permanently coöperating elements, one fixed to said mast section and the other to the periscope.

17. The combination, with a telescopic vertical mast, mechanism for extending and contracting it; of a periscope connected with one section of the mast to rise and fall in unison therewith, but capable of an independent rotary movement with respect thereto; means for holding said mast section against rotation during its vertical movements; and means for determining the bearing of the periscope relative to the ship's course comprising a pelorus scale fixed to said mast section, and a pointer fixed to the periscope and engaging said scale in all positions of the periscope.

18. In combination with the conning tower of a submarine, a vertically adjustable floor member for the observer in the conning tower, and a slidable and rotatable periscope connected to the floor member so that the latter will rise and fall with the periscope.

19. In combination with the conning tower of a submarine, a vertically adjustable floor member for the observer in the conning tower, a slidable and rotatable periscope connected to the floor member so that the latter will rise and fall with the periscope, means to raise and lower the floor member, and controlling means for the raising and lowering means operable at points in the same relation to the periscope irrespective of the rotation of the periscope.

In testimony whereof I have hereunto set my hand in presence of two subscribing witnesses.

MARLEY F. HAY.

Witnesses:
 ETHEL COHEN,
 A. E. HAEK.